United States Patent [19]

Arnhold et al.

[11] Patent Number: 5,551,782
[45] Date of Patent: Sep. 3, 1996

[54] COMPONENT HAVING AT LEAST ONE SPLIT BEARING SEAT AND METHOD OF PRODUCING SAME

[75] Inventors: Volker Arnhold, Wuppertal; Uwe Eilrich, Lindlar; Harald Neubert, Monheim, all of Germany

[73] Assignee: Sintermetallwerk Krebsöge GmbH, Radevormwald, Germany

[21] Appl. No.: 313,257

[22] PCT Filed: Jan. 26, 1994

[86] PCT No.: PCT/EP94/00199

§ 371 Date: Oct. 4, 1994

§ 102(e) Date: Oct. 4, 1994

[87] PCT Pub. No.: WO94/18463

PCT Pub. Date: Aug. 18, 1994

[30] Foreign Application Priority Data

Feb. 8, 1993 [DE] Germany ............ 43 03 592.2

[51] Int. Cl.⁶ .................. B21D 53/10; F16C 9/04
[52] U.S. Cl. ............. 384/294; 29/888.09; 29/413; 384/503
[58] Field of Search ............ 384/276, 288, 384/294, 295, 429, 430, 434, 503, 457; 29/888.09, 888.091, 888.092, 413; 74/579 R, 579 E

[56] References Cited

U.S. PATENT DOCUMENTS

| | | | |
|---|---|---|---|
| 2,371,400 | 3/1945 | Mantle | 384/294 |
| 4,684,267 | 8/1987 | Fetouh | 384/503 X |
| 4,802,269 | 2/1989 | Mukai et al. | 74/579 R X |
| 4,860,419 | 8/1989 | Hekman | 29/888.09 |
| 4,884,900 | 12/1989 | Pirault et al. | 384/503 X |

FOREIGN PATENT DOCUMENTS

| | | |
|---|---|---|
| 0167320 | 4/1987 | European Pat. Off. . |
| 0342800 | 11/1989 | European Pat. Off. . |
| 3806236 | 8/1989 | Germany . |
| 2245318 | 1/1992 | United Kingdom . |

OTHER PUBLICATIONS

Patent Abstracts of Japan, vol. 8, No. 168 (C-236), Aug. 3, 1984, JP59067364 of Apr. 17, 1984.

T. Bell, "Surface treatment and coating of PM components", Powder Metallurgy, vol. 34, No. 4, 1991, pp. 253–258.

*Primary Examiner*—Thomas R. Hannon
*Attorney, Agent, or Firm*—Spencer & Frank

[57] ABSTRACT

A component made from a preform made of a first material and having a bearing seat defining a bearing seat surface, and a method of producing the component. The component includes a bearing cap portion, and a remainder portion split from the bearing cap portion and adapted to mate therewith. The method comprises the step of coating the bearing seat surface of the preform with a second material different from the first material for providing a bearing layer made of the second material on the bearing seat surface, the bearing layer having a running face. The step of coating includes the step of thermal spraying the second material on the bearing seat surface. The preform is separated into the bearing cap portion and the remainder portion. The bearing layer is split by fracture separation at a separation region of the bearing layer into a bearing cap bearing layer portion corresponding to the bearing cap portion, and a remainder bearing layer portion corresponding to the remainder portion.

16 Claims, 1 Drawing Sheet

COMPONENT HAVING AT LEAST ONE SPLIT BEARING SEAT AND METHOD OF PRODUCING SAME

FIELD OF THE INVENTION

The invention relates to a method of producing a component from a preform, the component having at least one split bearing seat formed by a bearing cap, in which method the bearing cap is separated from the preform.

BACKGROUND OF THE INVENTION

Such components are configured as, for example, connecting rods having one small connecting rod eye, one large connecting rod eye and a shaft, the large connecting rod eye having a split bearing seat for supporting the connecting rod on the crankshaft. Because the invention relates in particular to the production of a connecting rod, the discussion below is devoted primarily to a connecting rod, but only by way of example and not by way of limitation.

A connecting rod is generally produced in that first a preform is produced, for example by means of forging, casting or powder-metallurgy methods; the inside dimension of the large connecting rod eye has an overdimension in the region of the future separation point. At this location the large connecting rod eye is separated, for example by means of sawing, extensively eliminating the overdimension. On the one hand, the separation surfaces of the connecting rod cap formed in this way and, on the other hand, the remainder of the connecting rod, are processed in a further method step, for example by means of grinding, so as to fit together precisely. In its finished state, the connecting rod cap is attached to the remainder of the connecting rod by means of connecting rod screws; the screw holes required for these can be bored prior to or following separation. In the assembled state of the connecting rod, the mechanical processing of the bearing seat is subsequently effected to receive bearing shell halves, which are disposed between connecting rod and crankshaft, forming a slide bearing.

The mechanical processing of the bearing seat usually encompasses rough-machining, fine-machining and superfinishing, by means of turning, precision-turning or honing. Furthermore, recesses must be provided in the bearing seat of the connecting rod eye which cooperate with corresponding latches of the bearing shell halves to prevent relative rotation of the bearing shells during operation.

In particular, the two bearing shell halves must be produced with high precision, because on the one hand the inside surfaces of the bearing shell halves, together with the crankshaft, form the slide bearing with a necessary slide bearing fit, and on the other hand, the outer surfaces of the bearing shells must be adapted to the bearing seat of the large connecting rod eye of the connecting rod. To assure a secure seating of the bearing shell halves, it is necessary, among other things, that the bearing shell halves be clamped between the connecting rod cap and the remainder of the connecting rod. It cannot be ruled out here that, when the connecting rod cap is screwed on and thus the bearing shell halves are clamped, deformations and thus removal of material will occur, the consequence of which is imprecise fitting of the inner surface of the bearing shell halves.

Despite the most careful processing and high fitting precision, it cannot always be avoided that, for example, the connecting rod cap is displaced on the remainder of the connecting rod because of the extremely high stresses of a connecting rod during operation, and thus a perfect seating of the bearing shell halves is no longer assured. Moreover, it is possible that the bearing shells still rotate despite measures against relative rotation. This inevitably leads to destruction of the slide bearing and thus to a breakdown of the motor.

A connecting rod is known from DE-PS 38 06 236 whose connecting rod cap is separated from the remainder of the connecting rod by means of fracture separation. In this case a fracture surface having a large, irregular surface is created as the separation surface, which virtually excludes a lateral displacement of the connecting rod cap on the remainder of the connecting rod. Furthermore, it is accomplished that only the respective connecting rod cap separated from the preform can be attached to the respective remainder of the connecting rod, because the fracture surface is unique, which rules out a confusion of individual parts, for example during assembly or repair of the motor. As before, however, bearing shells must be inserted into connecting rods produced in this way, because the material from which the connecting rod is made is not suitable as a slide bearing material. Therefore, the danger arises that the bearing shells rotate in the bearing seat, despite the measures against relative rotation to be likewise provided in the form of recesses and latches in the bearing seat, and have as a consequence a breakdown of the motor.

The object of the invention is to create a component, for example a connecting rod having a split bearing seat, in which the above-named disadvantages are avoided to the greatest extent.

SUMMARY OF THE INVENTION

The object is accomplished in accordance with the invention in that a bearing layer made of a material different from that of the preform is applied to the bearing seat surface of the preform, and that at least the bearing layer is split by means of fracture separation. This has the advantage that, on the one hand, the bearing material is applied to the bearing seat surface, for example to the bearing seat surface of the large connecting rod eye, in an adhering manner, which effects a permanent connection between bearing material and connecting rod. On the other hand, an advantage exists that the outer surface of the bearing seat of the connecting rod no longer needs to be mechanically processed later to fit exactly, because possible imprecisions are compensated by the application of the bearing layer. Accordingly, it is only still necessary that the inner side of the bearing layer be mechanically processed to fit exactly. Another advantage is to be seen in that, after separation of the bearing layer and reassembly, a virtually seamless separation line is created. The inside surface, that is, the running face of the bearing layer, is correspondingly nearly completely even, because of which, for example, in the embodiment as a slide bearing, the structure of the lubricant layer between the crankshaft on one side and the bearing layer on the other is not impaired. Furthermore, the lubricant layer is hardly influenced by the seamless separation point, which assures high stability of this layer. Thus a metallic contact of the crankshaft and the connecting rod during operation is reliably prevented.

In a useful embodiment of the invention, it is provided that the bearing cap is separated from the preform prior to the coating of the bearing seat surface, and detachably reassembled with the preform. It is advantageous when the separation of the bearing cap is likewise effected by means of fracture separation. In this instance, for example in a connecting rod, it is assured that, on the one hand, the connecting rod cap is connected in a form-fitting manner with the remainder of the connecting rod because of the large surface of the fracture point, and thus a lateral displacement between these individual parts is prevented. After assembly of the individual parts, the material forming the bearing layer is applied to the bearing seat surface, and the coated preform is again separated by means of fracturing. The formed parts of the component therefore have a fracture surface both on the bearing layer and on the separation surface of the bearing cap, so that a particularly good connection of the components is permitted.

In a further embodiment of the invention, it is provided that the bearing seat surface of the preform is first coated with the material that forms the bearing layer, and subsequently, the bearing cap, together with the part of the bearing layer applied to its seating surface, is separated from the preform by means of fracture separation. This has the advantage that the method step of fracture separation need only be executed once per component.

According to the invention, in the production of a connecting rod, the individual steps can be followed such that the preform is produced by means of original shaping or reshaping methods, and subsequently, the screw holes for the connecting rod screws are bored into the preform. Afterward, the connecting rod cap can be separated from the remainder of the connecting rod by means of sawing or fracture separation. In a further step, the bearing seat surface of the preform is then prepared according to the coating method. This is advisably effected in the assembled state of the connecting rod. In the case of fracture separation of the connecting rod cap from the remainder of the connecting rod, it will be necessary for a fracture-initiating notch to be provided in the region of the separation point to be created. This can take place, for example, by means of mechanical processing.

It is, however, particularly advantageous when the preform is produced by means of a powder-metallurgy method, for example sintering, because in this instance the fracture-initiating notch can already be provided during production of the preform. Because of this, additional mechanical processing of the bearing seat surface is avoided.

It is, however, particularly advantageous when the preform is produced by means of sinter-forging, in which the preformed green compact is provided prior to sintering with a notch that obtains a protective layer, particularly an oxide layer, between sintering and forging. During subsequent forging, the notch is nearly completely closed to become a preform. The fracture-initiating notch as such is thus no longer present, but the applied protective layer prevents a connection of the powder-metallurgical starting material at this location. This has the particular advantage that none of the material forming the slide bearing layer can enter the notch, which would impair the fracture separation at the desired separation point, because of the later application of the slide bearing layer prior to separation of the connecting rod cap from the remainder of the connecting rod. The protective layer is configured as, for example, an oxide layer produced in that the formed body is forged with the notch after sintering in the ambient atmosphere.

After fracture separation of the bearing layer with or after separation of the connecting rod cap from the remainder of the connecting rod, the components are reassembled and the inner surface of the bearing layer is mechanically further processed according to the desired fit. Thus, burred areas that may appear are also removed during the fracture separation.

The method according to the invention has the advantage that the material of the preform on the one hand and the material of the bearing layer on the other hand can be selected according to their individual requirements. Hence, for example, the preform can comprise a material adapted to the mechanical stress, e.g. based on iron, while the bearing layer comprises a conventional bearing material, e.g. based on aluminum.

In the production of the preform by means of powder-metallurgy methods, it can be provided that the preform is made of a pre-alloyed sintering material comprising the following (in weight-%):

0.1 to 0.5% Mn
0.1 to 2.0% Mo
0.2 to 2.2% Ni
0.5 to 2.5% Cu
0.3 to 1.0% C
Remainder: Fe Instead of this pre-alloyed powder, the sintering material can also comprise a partially-alloyed powder of the following composition (in weight %):

0.2 to 1.5% Mo
1.0 to 4.0% Ni
1.0 to 3.0% Cu
0.3 to 1.0% C
Remainder: Fe

A further possibility for the composition of the sintering material is a composite powder comprising (in weight-%):

1.0 to 3.0% Cu
0.3 to 1.0% C
Remainder: Fe

Another pre-alloyed powder containing (in weight-%):

0.5 to 3% Mo
0.3 to 1.0% C
0 to 3% Cu
Remainder: Fe can also be used as the sintering material.

The bearing layer can have, for example, the following composition (in weight-%):

0.7 to 1.3% Cu
14.5 to 22.5% Sn
$\leq$0.7% Si
$\leq$0.7% Fe
$\leq$0.7% Mn
Remainder: Al Furthermore, the possibility exists that the bearing material comprises (in weight-%):

11.0 to 13.0% Si
0.8 to 1.5% Cu
$\leq$1.3% Ni
0.8 to 1.3% Mg
$\leq$0.7% Fe
$\leq$0.3% Mn
$\leq$0.3% Zn
$\leq$0.2% Ti
Remainder: Al or (in weight-%):

95 to 97% Al
3 to 5% Pb.

Of course, the bearing layer can also comprise an alloy based on copper, for example (in weight-%):

3 to 10% Sn
10 to 23% Pb
Remainder: Cu or (in weight-%):

74% Cu

20% Pb

2% Sn

4% Ni.

These materials listed for the preform and the bearing layer can additionally include the impurities dictated by production.

According to the invention, the bearing layer is applied to the bearing seat surface of the preform by means of thermal spraying methods. In particular, flame-spraying, high-speed flame-spraying or plasma-spraying are considered as thermal spraying methods. These permit a particularly even application of the material forming the bearing layer. Moreover, pretreatment of the bearing seat surface is generally not necessary, or only necessary to a small extent. Particularly in the use of plasma-spraying, it is possible that solid lubricants can be added to the bearing material and, for example, incorporated later into the plasma stream. Examples of solid lubricants that can be added include graphite, manganese sulfide or calcium fluoride.

Depending on the selection of the bearing material, it can occur that this material exhibits no distinctive brittle-fracture behavior. It can therefore be useful that at least the bearing layer is embrittled, by means of targeted thermal treatment, for example cooling, in the region of the separation point. To achieve a sufficient brittle-fracture behavior of the entire separation point, it can also be useful that the preform is also embrittled by means of targeted thermal treatment, for example cooling, at least in the region of the separation point. Cooling can take place at the separation point, for example, by means of partial application or spraying of a liquefied gas, such as nitrogen.

It is obvious that, with this method according to the invention, for example, a connecting rod can be produced whose bearing layer is permanently connected to the connecting rod, particularly fixed against relative rotation. Furthermore, the running face of the bearing layer has virtually no separation surface that could cause an impairment of, for example, the lubricating oil between the crankshaft on one side and the running face on the other. In addition, the connecting rod can be produced simply and quickly.

The invention further relates to a component made from a preform, the component having at least one split bearing seat formed by a bearing cap, and a base body whose bearing seat surface is provided with a bearing layer made of a material different from that of the base body, and that the separation point of the split bearing seat has, at least in the region of the bearing layer, a fracture surface created by fracture separation. This component can be configured as, for example, a connecting rod and be produced by means of the above-described method. In an advantageous embodiment of the component, the separation point likewise has a fracture surface between bearing cap and base part created by means of fracture separation.

BRIEF DESCRIPTION OF THE DRAWING

The invention is now described in detail by way of the connecting rod illustrated as an embodiment in the drawings.

Shown are in.

DETAILED DESCRIPTION OF THE INVENTION

Figure 1:
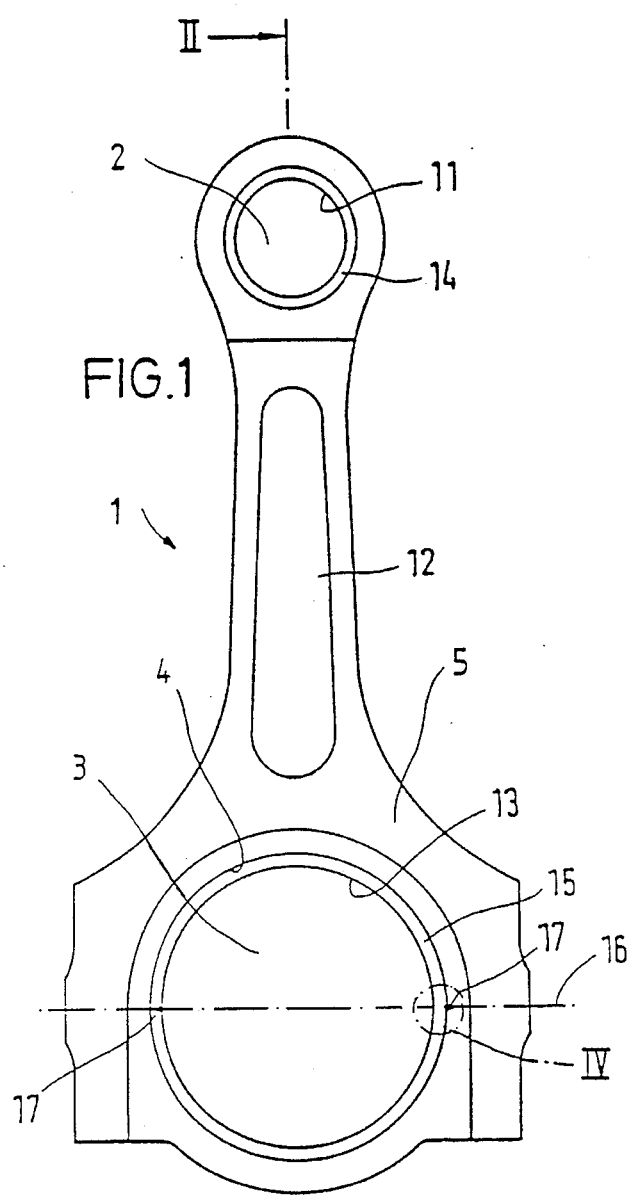
FIG. 1 a view of a connecting rod.
Figure 2:
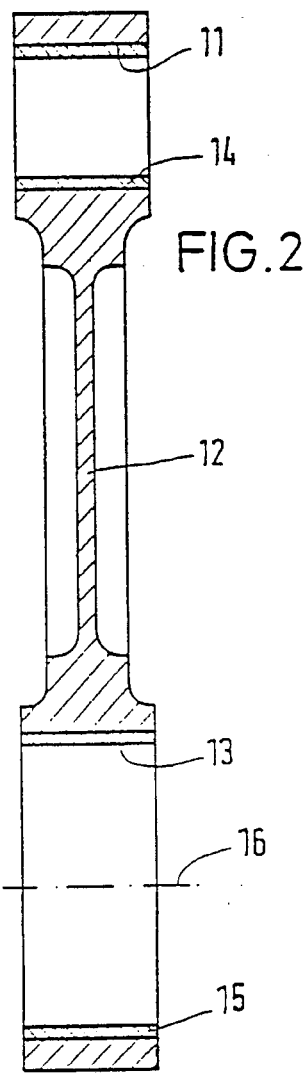
FIG. 2 a section along the line II—II according to FIG. 1.

The connecting rod 1 illustrated in the drawing has a small connecting rod eye 2, a shaft 12 and a large connecting rod eye 3. The large connecting rod eye 3 has a split bearing seat whose bearing seat surface 4 is provided with a bearing layer 15. The surface 13 of the bearing layer 15 forms the running face for the slide bearing support of the connecting rod on the crankshaft, not shown.

Figure 4:
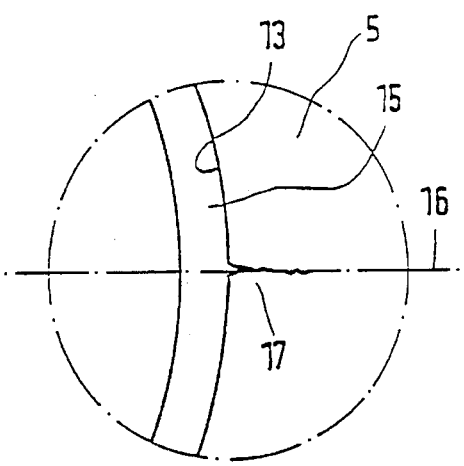
FIG. 4 the detail IV according to FIG. 1.

FIG. 1 represents the connecting rod in a state in which the bearing layer 15 has been applied to the bearing seat surface 4 of the preform and the separation of the connecting rod cap 18 from the remainder of the connecting rod 5 has not yet taken place. For separation of the connecting rod cap 18 along the separation plane 16, the preform has a fracture-initiating notch 17 on the bearing seat surface 4, in the region of the separation plane 16; this notch permits purposeful fracture separation. As can be seen particularly from FIG. 4, the fracture-initiating notch 17 is completely covered by the bearing layer 15.

The embodiment illustrated in the drawing is of a preform that has been produced by means of sinter-forging. Prior to sintering, the green compact was provided with a notch that is virtually completely closed during subsequent forging. This state is illustrated particularly clearly in FIG. 4. This fracture-initiating notch 17 is sufficient to effect a defined fracture separation of the connecting rod cap 18 both from the remainder of the connecting rod 5 and of the bearing layer 15 at the desired location.

Figure 3:
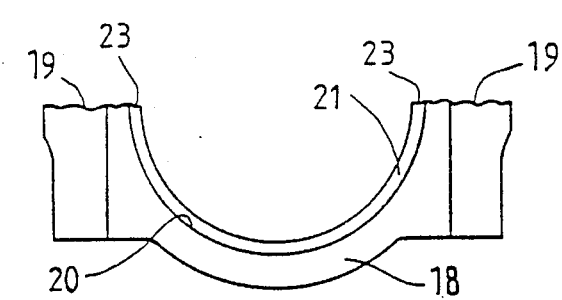
FIG. 3 a connecting rod cap after fracture separation.

A connecting rod cap 18 following fracture separation is illustrated in FIG. 3. In the embodiment shown in the drawing, the connecting rod cap 18 has been separated, with the applied part 21 of the bearing layer 15, from the remainder of the connecting rod 5 by means of fracture separation. The surface of the separation point 19 created between connecting rod cap 18 and the rest of connecting rod 5 by means of the fracture separation, and the separation point 23 between the corresponding bearing layers 15, 21 have a large and irregular surface, so that this connecting rod cap 18 only fits onto the corresponding remainder of the connecting rod 5. A lateral displacement of the connecting rod cap 18 on the remainder of the connecting rod 5 is thus practically excluded. The connecting rod cap 18 is connected to the remainder of the connecting rod 5 by means of connecting rod screws, not shown.

Depending on the configuration and material of the bearing layer, it can be useful also to provide its inner surface with a fracture-initiating notch, for example by means of mechanical processing. The fracture-initiating notch in this instance can be dimensioned such that the fracture-initiating notch is removed during the subsequent processing of the running face, e.g. by means of precision turning or honing.

The small connecting rod eye 2 has a bushing 14, which has been pressed into the small connecting rod eye in a conventional manner. Depending on the dimensions of the small connecting rod eye 2, it can also be provided that the bearing seat surface 11 of the small connecting rod eye 2 is likewise coated with the bearing material in a thermal spraying method.

We claim:

1. A method of producing a component from a preform made of a first material and having a bearing seat defining a bearing seat surface, the component including a remainder portion, and a bearing cap portion split from the remainder portion and adapted to mate therewith, the method comprising the steps of:

coating the bearing seat surface of the preform with a second material different from the first material for providing a bearing layer made of the second material on the bearing seat surface, the bearing layer having a running face, the step of coating including the step of thermal spraying the second material on the bearing seat surface;

separating the preform into the bearing cap portion and the remainder portion; and splitting the bearing layer by fracture separation at a separation region of the bearing layer into a bearing cap bearing layer portion corresponding to the bearing cap portion, and a remainder bearing layer portion corresponding to the remainder portion.

2. The method according to claim 1, wherein the step of thermal spraying includes the step of applying the second material to the bearing seat surface by flame spraying of the second material.

3. The method according to claim 1, wherein the step of thermal spraying includes the step of applying the second material to the bearing seat surface by high speed flame spraying of the second material.

4. The method according to claim 1, wherein the step of thermal spraying includes the step of applying the second material to the bearing seat surface by plasma spraying of the second material.

5. The method according to claim 1, wherein the step of separating includes the step of splitting the preform by fracture separation at a separation region of the preform.

6. The method according to claim 5, wherein the step of splitting the bearing layer is performed simultaneously with the step of splitting the preform.

7. The method according to claim 5, further comprising the step of providing a fracture initiating notch at the separation region of the preform prior to the step of splitting the preform.

8. The method according to claim 5, further comprising the step of embrittling the separation region of the preform by targeted thermal treatment prior to the step of splitting the preform.

9. The method according to claim 5, further comprising the step of cooling the separation region of the preform prior to the step of splitting the preform.

10. The method according to claim 1, further comprising the step embrittling the separation region of the bearing layer by targeted thermal treatment prior to the step of splitting the bearing layer.

11. The method according to claim 1, further comprising the step of cooling the separation region of the bearing layer prior to the step of splitting the bearing layer.

12. The method according to claim 1, further comprising the steps of:

matably joining the bearing cap portion and the remainder portion after the step of separating and the step of splitting; and finishing the running face of the bearing layer after the step of matably joining, the step of finishing comprising the step of cutting.

13. The method according to claim 1, further comprising the step of making the preform by one of sintering and sinter-forging.

14. The method according to claim 1, wherein the step of coating includes the step of thermal spraying a material containing copper and lead on the bearing seat surface.

15. The method according to claim 1, further including the step of making a connecting rod having a split connecting rod head as the component.

16. A component comprising:

a bearing cap;

a remainder portion separated from the bearing cap and adapted to be joined with the bearing cap for forming a split bearing seat therewith defining a bearing seat surface and a first fracture separation region, the bearing cap and the remainder portion being made of a first material; and a bearing layer made of a second material different from the first material, the bearing layer being disposed on the bearing seat surface and defining a second fracture separation region.

* * * * *